UNITED STATES PATENT OFFICE.

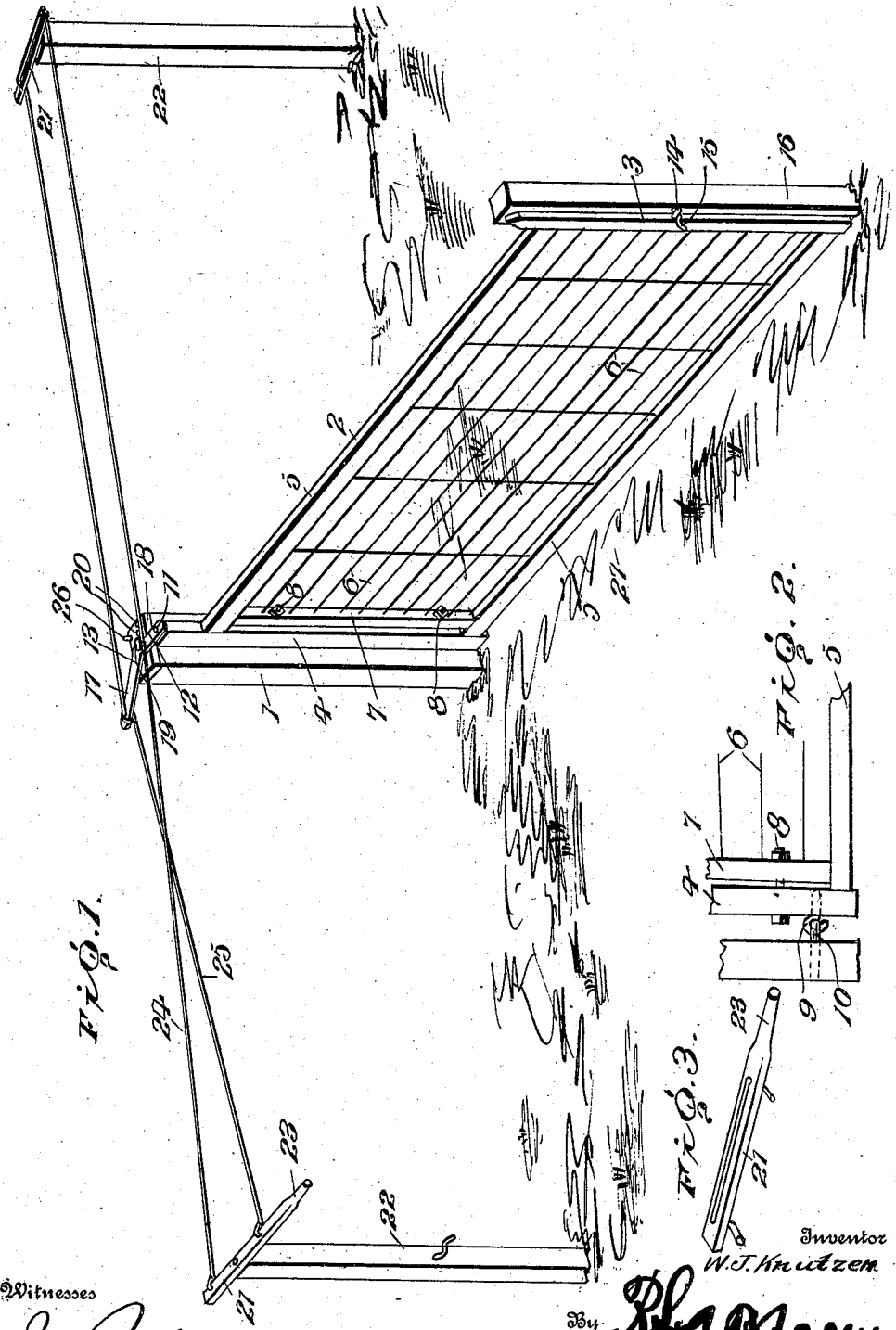

WILLIE J. KNUTZEN, OF BURLINGTON, WASHINGTON.

SWINGING GATE.

No. 881,413.         Specification of Letters Patent.      Patented March 10, 1908.

Application filed February 11, 1907. Serial No. 356,926.

*To all whom it may concern:*

Be it known that I, WILLIE J. KNUTZEN, citizen of the United States, residing at Burlington, in the county of Skagit and State of Washington, have invented certain new and useful Improvements in Swinging Gates, of which the following is a specification.

The present invention relates to certain new and useful improvements in swinging gates, and has for one of its principal objects to provide a novel means whereby the gate can be either opened or closed without requiring the operator to dismount from a horse or carriage upon which he may be riding.

For a full description of the invention and the merits thereof reference is to be had to the following description and accompanying drawings, in which:

Figure 1 is a perspective view of a gate embodying the invention. Fig. 2 is a detail view of the lower portion of gate and adjacent parts. Fig. 3 is a detail perspective view of one of the hand levers.

Corresponding and like parts are referred to in the following description and indicated in all the views of the drawings by the same reference characters.

In the embodiment of the invention illustrated in the drawings the numeral 1 designates a gate post having the horizontally swinging gate 2 hinged thereto. This gate is in the nature of a frame comprising the two vertical upright members 3 and 4 connected by the longitudinal members 5. A plurality of wires 6 are connected rigidly at one end thereof to the end 3 of the gate while their opposite extremities are attached to a vertical bar 7 which is adjustably secured to the end 4 of the gate by means of the bolts 8. It will thus be apparent that by turning the bolts 8 the bar 7 can be drawn towards the end 4 of the gate in such a manner as to stretch the wires 6 and produce the required tension therein. In the larger gates it may be found desirable to connect the longitudinal wires 6 by means of transverse wires such as are indicated in the drawings. The lower portion of the end 4 of the gate carries a hook member 9 which loosely engages an eye 10 projecting from the gate post. The upper end of the upright member 4 extends flush with the top of the gate post 1 and is pivotally connected by means of a pin 11 to the short arm 12 of the operating lever 13.

The swinging end of the gate 2 is provided with a projection 14 which is designed to engage a catch 15 upon a suitably located latch post 16 to normally hold the gate in a closed position. Referring more particularly to the specific construction of the operating lever 13 it will be observed that the long arm 17 thereof is arranged at an angle to the short arm 12 and that the said lever is pivotally mounted upon a bearing plate 18 at the upper end of the gate post by means of a pivot pin 19 passing through a selected one of a series of openings 20 in the bearing plate and entering the gate post 1. It will thus be apparent that by manipulating the long arm of the operating lever 13 the pivot end of the gate can be tilted to one side and at the same time drawn toward the gate post 1 in such a manner as to lift the projection 14 from the catch 15 upon the latch post and permit the gate to swing outwardly and assume an open position.

Hand levers 21 are employed for controlling the movements of the operating lever 13, the said hand levers 21 being pivotally mounted at intermediate points upon the upper extremities of suitable standards 22. These levers 21 swing in a horizontal plane and are each provided at one extremity with a handle portion 23 which projects inwardly toward the road in such a manner as to be conveniently grasped by a person traveling along the road. The outer end of one of the levers 21 is connected to the inner end of the opposite lever by means of a wire 24, while the inner end of the first mentioned lever is connected to the outer end of the second mentioned lever by means of a second wire 25 which is also connected to the extremity of the long arm 17 of the operating lever 13. It will thus be apparent that by properly manipulating either of the hand levers 21 the operating lever 13 can be swung upon its pivot and the pivot end of the gate thereby tilted in such a manner as to disengage the latch on the swinging end and cause the gate to assume an open position. Upon a reverse movement of the hand levers the gate will automatically close itself in a similar manner. If found desirable a stop 26 may be located upon the upper end of the gate post 1 in order to limit the swinging movement of the operating lever 13 in one direction.

Having thus described the invention, what is claimed as new is:

In a swinging gate, the combination of a gate post, a bearing plate secured to the upper end of the gate post and having a plurality of openings formed therein, a latch post, a catch mounted upon the latch post, a gate comprising a pair of upright members, a hinged connection between the lower portion of one of the upright members and the gate post, said upright member extending upwardly flush with the top of the gate post, a pin projecting from the extremity of the said upright member, an operating lever comprising a pair of arms disposed at an obtuse angle to each other, one of the said arms engaging the before mentioned pin projecting from the upright member of the gate, a pivot pin passing through the operating lever at the junction of the two arms thereof and engaging a selected one of the before mentioned openings in the bearing plate at the upper end of the gate post, a standard located upon each side of the gate post, a hand lever pivoted between its ends upon each of the standards, a cable connecting the inner end of one hand lever to the upper end of the opposite hand lever, and a second cable connecting the outer end of the first mentioned hand lever to the inner end of the second mentioned hand lever, and also engaging the outer arm of the operating lever.

In testimony whereof I affix my signature in presence of two witnesses.

WILLIE J. KNUTZEN. [L. S.]

Witnesses:
GEORGE F. KNUTZEN,
W. D. KNIPE.